United States Patent
Chang

(10) Patent No.: US 6,397,512 B1
(45) Date of Patent: Jun. 4, 2002

(54) FISHHOOK-EXTRACTING DEVICE

(76) Inventor: Ming-Hung Chang, No. 25, Tzu Chiang Rd., Chi Tu Dist., Keelung City (TW)

( * ) Notice: Subject to any disclaimer, the term of this patent is extended or adjusted under 35 U.S.C. 154(b) by 0 days.

(21) Appl. No.: 09/598,019

(22) Filed: Jun. 21, 2000

(51) Int. Cl.⁷ .................................................. A01K 97/18
(52) U.S. Cl. ..................................................... 43/53.5
(58) Field of Search ........................ 43/53.5; D22/149; 7/106; 30/123

(56) References Cited

U.S. PATENT DOCUMENTS

| | | | |
|---|---|---|---|
| 2,441,458 A | * 5/1948 | Underwood | 43/53.5 |
| 2,662,331 A | * 12/1953 | Borup | 43/53.5 |
| 2,897,626 A | * 8/1959 | Buller | 43/53.5 |
| 3,099,100 A | * 7/1963 | Wiseman | 43/53.5 |
| 3,713,243 A | * 1/1973 | Tetzner | 43/53.5 |

* cited by examiner

Primary Examiner—Kurt Rowman
(74) Attorney, Agent, or Firm—Rosenberg, Klein & Lee

(57) ABSTRACT

A fishhook-extracting device mainly includes an elongated shank, a front end of which is a tapered spiral portion being coated with a layer of rubber skin and having a ball-shaped tip, and a rear end of which is connected to a preferably elliptic flat member. The flat member is provided along a lateral side with a notch for a fish line to pass there and be held in place, and at a front side with a U-shaped recess forming a sharp blade for cutting a fish line. When using the device to extract a fishhook from a caught fish, first move the shank for the spiral portion to tangles with the fish line to which the fishhook is connected, then push the shank along the fish line into the fish's mouth to allow the spiral portion to catch the fishhook. Thereafter, the shank is slightly pushed further to back the fishhook a little, so that the fishhook is disengaged from the fish and can therefore be easily extracted without badly hurting the fish.

1 Claim, 6 Drawing Sheets

A - A

B - B

FISHHOOK-EXTRACTING DEVICE

BACKGROUND OF THE INVENTION

The present invention relates to a fishhook-extracting device, and more particularly to a fishhook-extracting device that can be easily extended into a caught fish to extract the fishhook without hurting the fish.

Fishing has long been a popular outdoor activity and it is known that a fish would usually be caught by a fishhook when it bites the bait. With the rapidly developed conception of protecting wildlife, as well as the fact the fish dies quickly without water, it has become a difficult but important thing for most fishermen to find a way to quickly extract the fishhook from the fish's mouth without badly hurting or killing the fish.

SUMMARY OF THE INVENTION

A primary object of the present invention is to provide an improved device for extracting a fishhook from a caught fish without hurting the fish.

Another object of the present invention is to provide a fishhook-extracting device that is provided with means to prevent a fishhook stuck in the device from easily slipping off the device.

A further object of the present invention is to provide a fishhook-extracting device that may be used to conveniently cut a fish line.

To achieve the above and other objects, the fishhook-extracting device provided by the present invention mainly includes an elongated shank, a front end of which is a tapered spiral portion being coated with a layer of rubber skin and having a ball-shaped tip, and a rear end of which is connected to a preferably elliptic flat member. The flat member is provided along one lateral side with a notch for a fish line to pass there and be held in place, and at a front side with a U-shaped recess forming a sharp but save blade for cutting a fish line. When using the device to extract a fishhook from a caught fish, first move the shank for the spiral portion to tangles with the fish line to which the fishhook is connected, then push the shank along the fish line into the fish's mouth until the fishhook is stuck in the spiral portion. The rubber skin allows a frictional contact of the spiral portion with the fishhook and the ball-shaped tip prevents the fishhook from easily slipping off the spiral portion. Thereafter, the shank is slightly pushed further to back the fishhook a little, so that the fishhook is disengaged from the fish and can therefore be easily extracted without badly hurting the fish.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
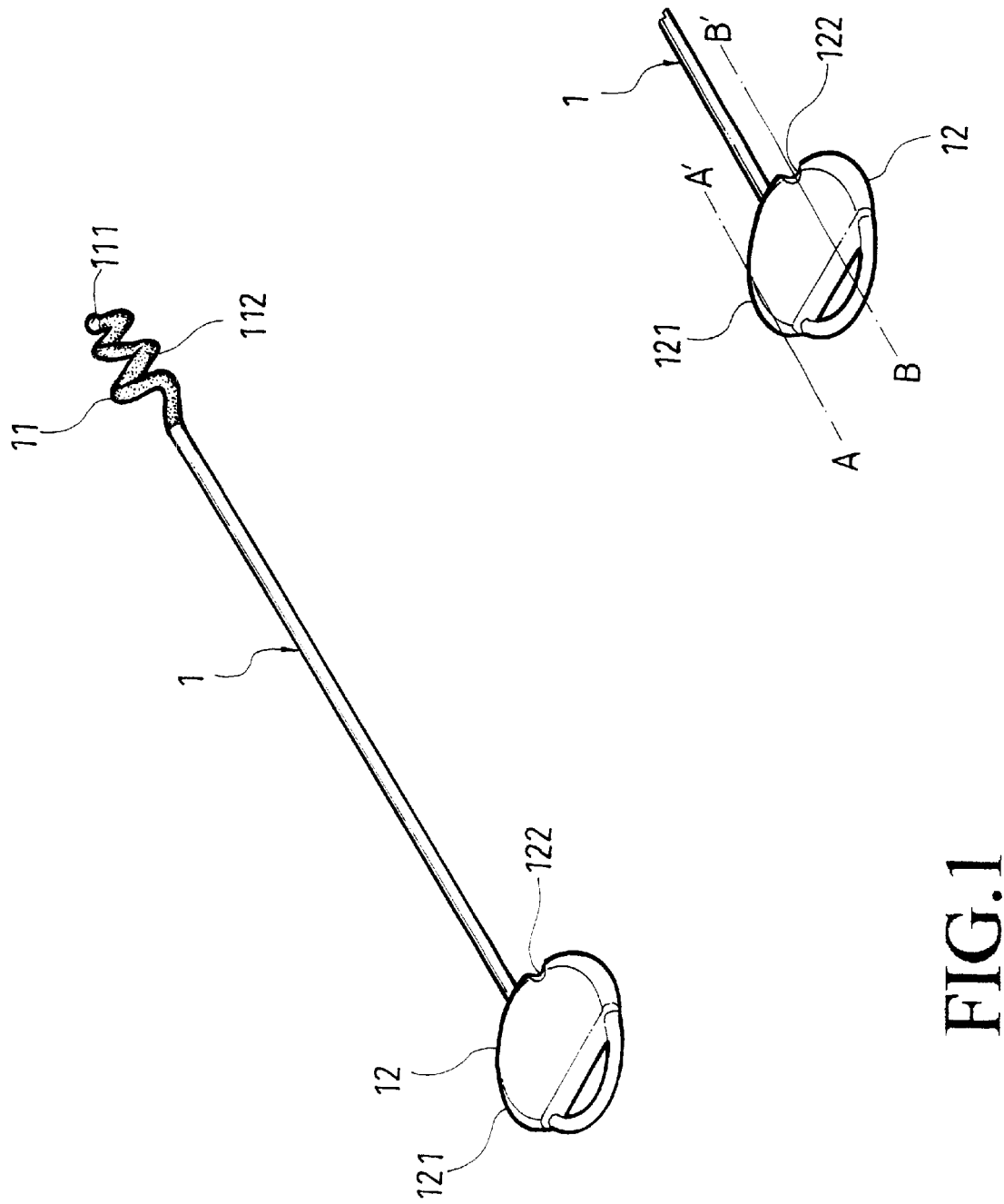
FIG. 1 is a perspective of a fishhook-extracting device according to the present invention.
Figure 2A:
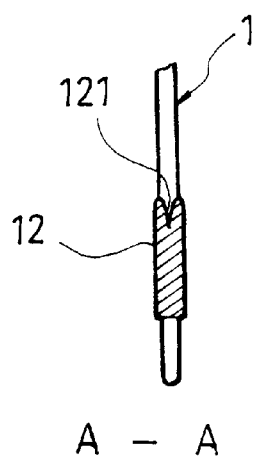
FIG. 2A is a sectional view taken on line A—A of FIG. 1.
Figure 2B:
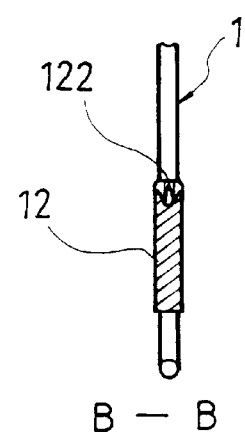
FIG. 2B is a sectional view taken on line B—B of FIG. 1.

Please refer to FIG. 1 that is a perspective of a fishhook-extracting device according to the present invention. The device mainly includes a rigid and elongated shank 1, a front end of which is a tapered spiral portion 11 looked like a corkscrew with a ball-shaped tip 111, and a rear end of which is connected to a flat member 12. For the spiral portion 11 of the shank 1 to have increased frictional resistance, it is coated with a layer of rubber skin 112. And, for a user to more easily grip the fishhook-extracting device at the flat member 12, it is preferable the flat member 12 is elliptic in shape. As can be seen from FIG. 2A, the flat member 12 is provided along a length of its edge at one lateral side with a V-shaped notch 121. And, as can be seen from FIG. 2B, the flat member 12 is further provided at a front side with a U-shaped recess in which a sharp blade 122 is formed.

Figure 3:
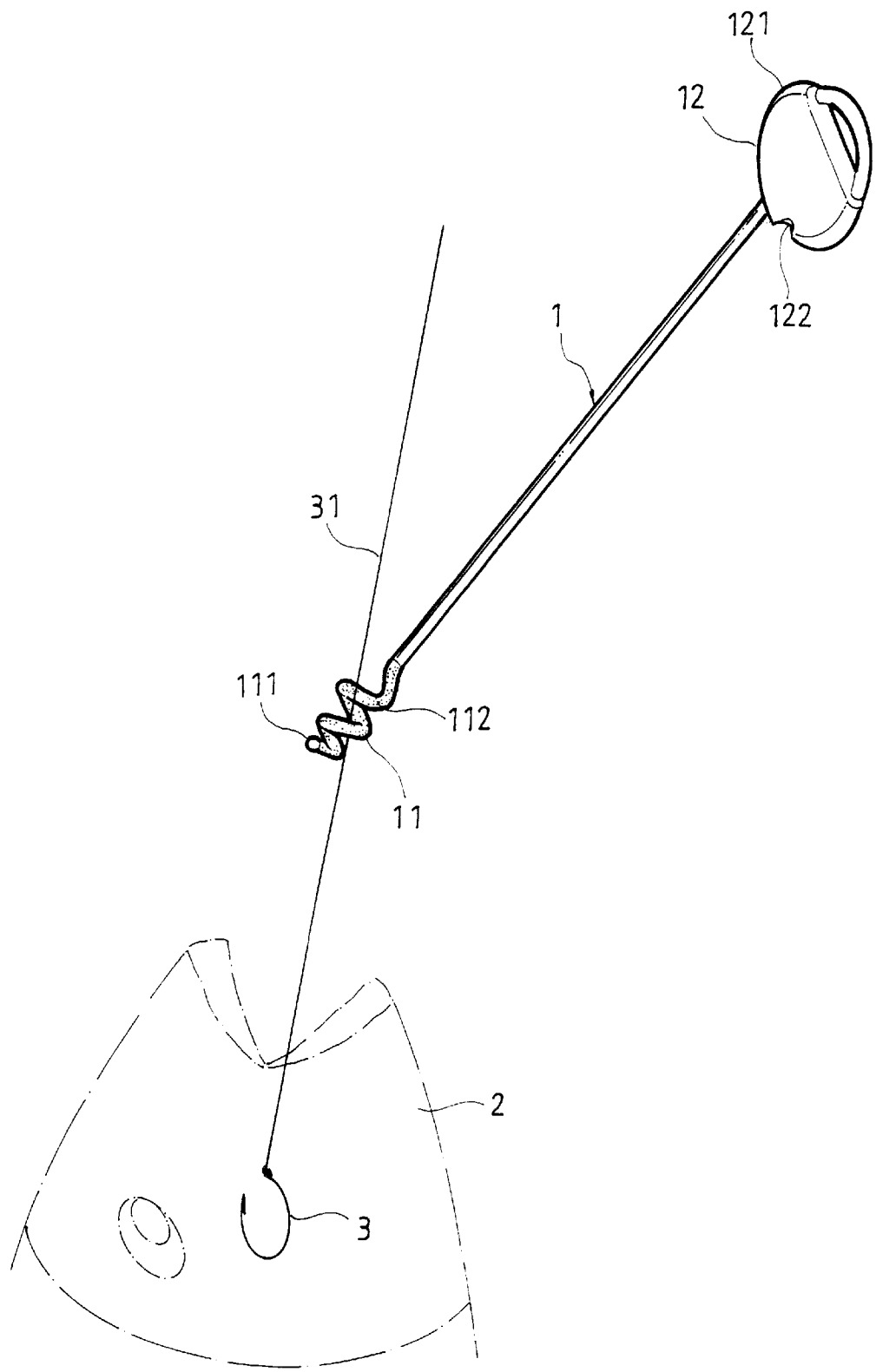
FIGS. 3, 4 and 5 sequentially show movements of using the fishhook-extracting device of the present invention to extract a fishhook from a fish caught by the fishhook.

FIG. 3 illustrates the first step of using the fishhook-extracting device of the present invention to extract a fishhook 3 from a fish 2 caught by a fisherman (not shown). In this first step, approach the shank 1 of the device to a fish line 31, to a front end of which the fishhook 3 is connected, so that the fish line 31 slidably tangles with the spiral portion 11 at the front end of the shank 1. Then, keep the shank 1 in this position and move it along the fish line 31 until the spiral portion 11 is moved into the fish 2 via its mouth.

Figure 4:
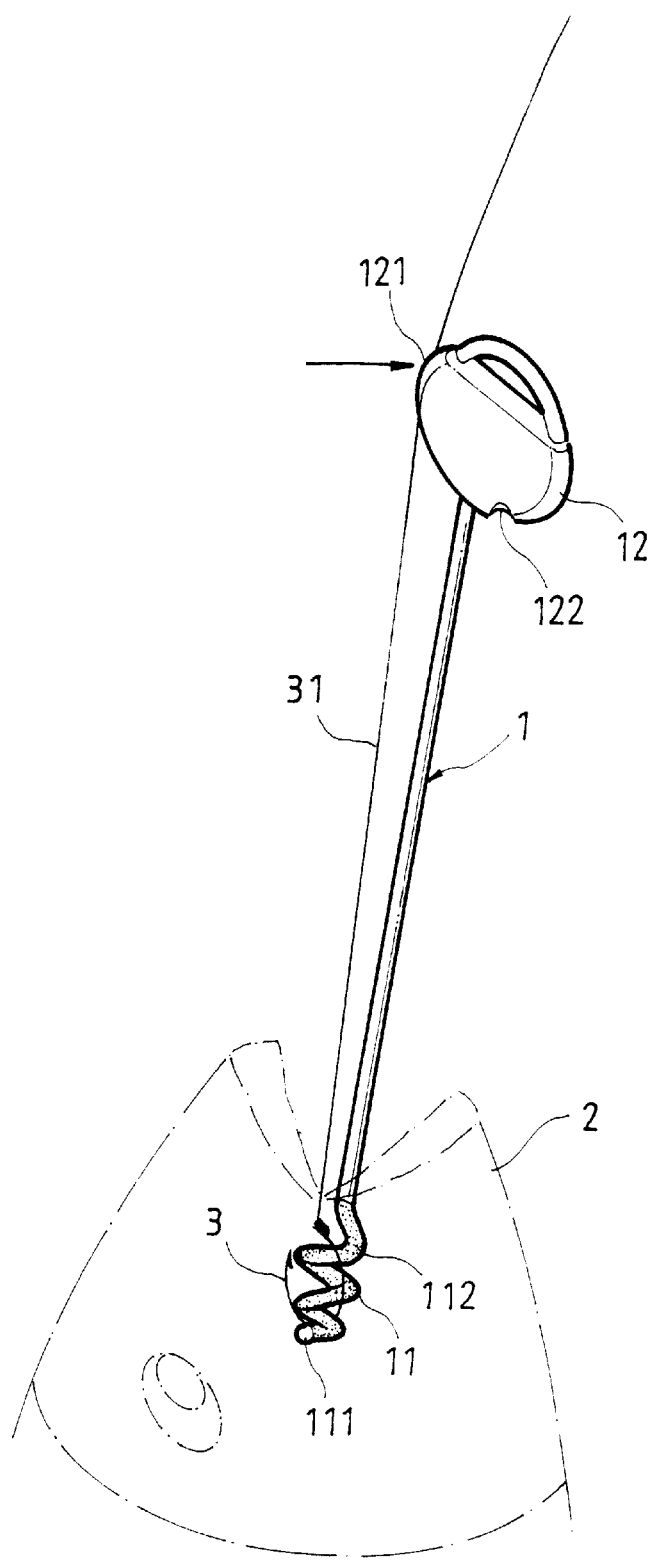

Please refer to FIG. 4. When the spiral portion 11 has been moved into the fish 2, push the shank 1 a little further into the fish 2, so that the spiral portion 11 is moved from the fish line 31 to the fishhook 3 and have the fishhook 3 stuck in the spiral portion 11. At this point, move and tense the fish line 31 so that it passes the notch 121 at one lateral side of the flat member 12 connected to another end of the shank 1 and pulls the fishhook 3 to closely contact with the spiral portion 11. The rubber skin 112 of the spiral portion 11 enables the spiral portion 11 to frictionally contact with the fishhook 3 without the risk of slip off the fishhook 3 while the fish line 31 is tensed.

Figure 5:
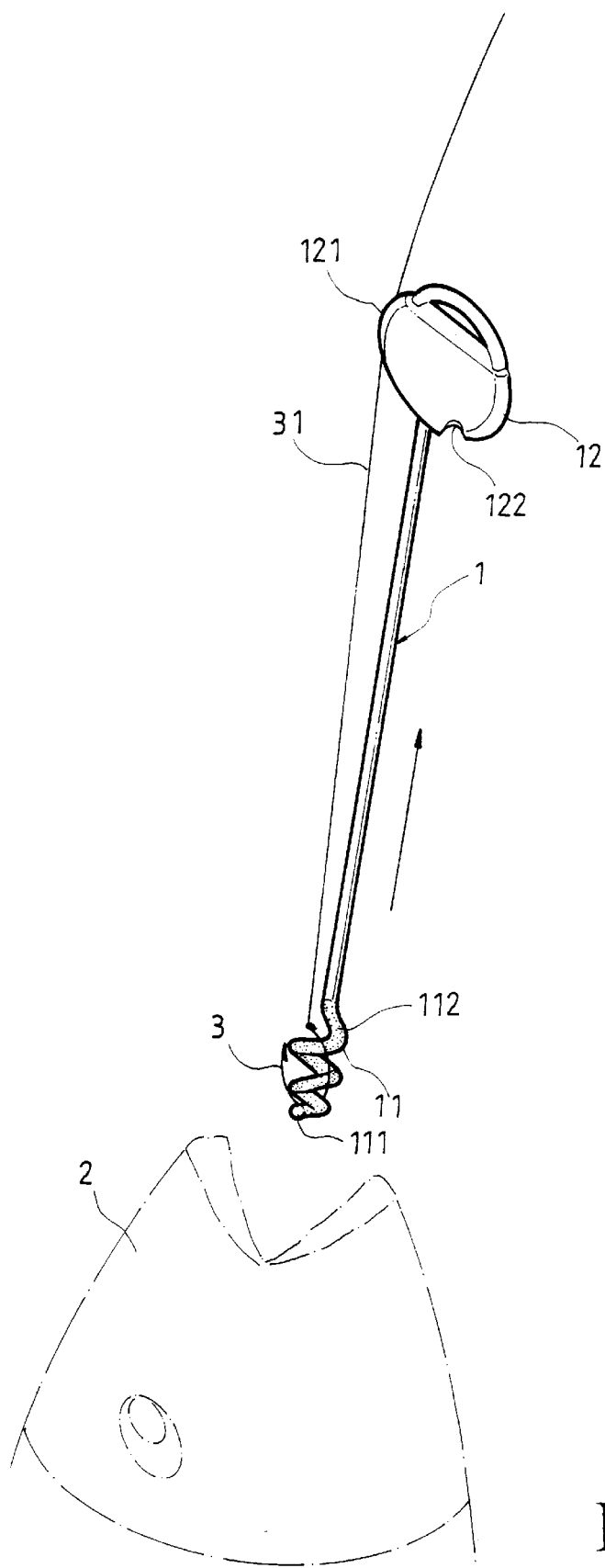
Figure 6:
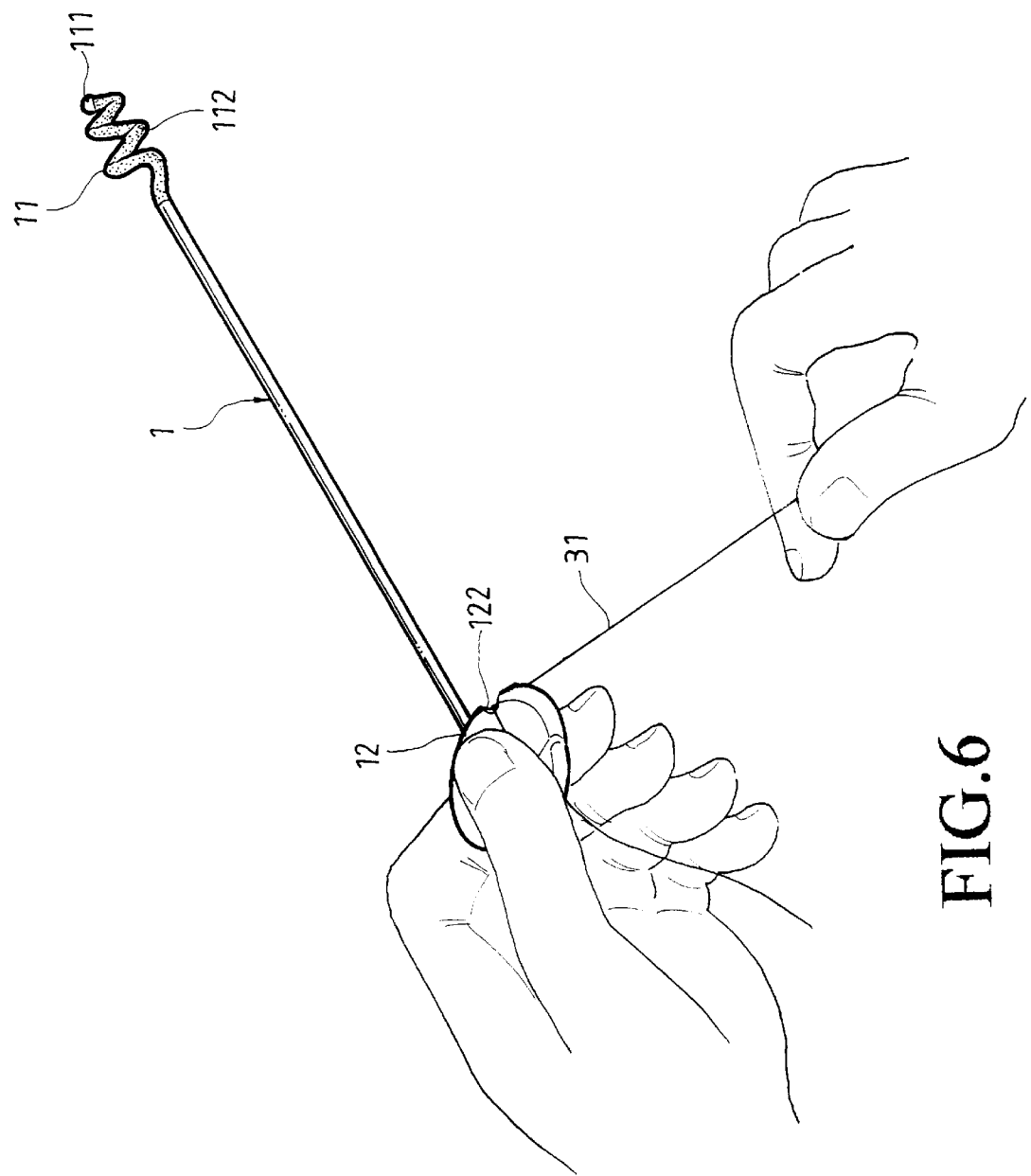
FIG. 6 shows the fishhook-extracting device of the present invention is used to cut a fish line.

After the fish line 31 has been located in the notch 121 and tensed, the fisherman may grip the flat member 12 with one hand and hold the fish 2 with another hand, and then slightly pushes the shank 1 further to back the fishhook 3 a little before pulling out the shank 1 and the fishhook 3 stuck in the spiral portion 11 from the fish 2, as shown in FIG. 5. By extracting the fishhook 3 with the device of the present invention in the above steps, the fishhook 3 may be easily removed from the fish 2 without badly hurting the latter.

The sharp blade 122 in the U-shaped recess provided at a front side of the flat member 12 may be used to conveniently cut the fish line 31 to separate it from the fishhook 3. When the fish line 31 becomes tangled or is tangled with other fish lines, the sharp blade 122 may also be used to quickly cut the tangled fish line.

The fishhook-extracting device of the present invention enables quick extraction of a fishhook from a fish without hurting the fish, and is therefore a product not only practical for use but also meeting the conception of protecting wildlife.

What is claimed is:

1. A fishhook-extracting device, comprising a rigid and elongated shank that has a front end in the form of a tapered spiral portion, and a rear end connected to a flat member having an elliptical shape; said spiral portion of said shank being coated with a layer of rubber skin and having a ball-shaped tip; and said flat member being provided along a length of its edge at one lateral side thereof with a notch having a V-shaped cross section and at a front side with an arcuate recess in which a sharp blade is disposed for conveniently cutting a fish line;

whereby when said shank is moved along a fish line toward a fish caught by a fishhook connected to a front end of the fish line, said spiral portion is caused to tangle with said fish line and extend into the fish's mouth to get the fishhook stuck therein, said ball-shaped tip of said spiral portion prevents said stuck fishhook from moving out of said spiral portion, said rubber coat on said spiral portion prevents said fishhook from easily slipping off the spiral portion, and said V-shaped notch is useful in holding and tensing the fish line in order to pull said fishhook to closely contact with said rubber-coated spiral portion, and when said shank is slightly pushed into the fish further, said fishhook is backed a little to be released from the fish and can then be extracted from the fish.

* * * * *